C. DREIBUSS.
TREE OR STAFF HOLDER.
APPLICATION FILED MAR. 17, 1908.
913,474.
Patented Feb. 23, 1909.
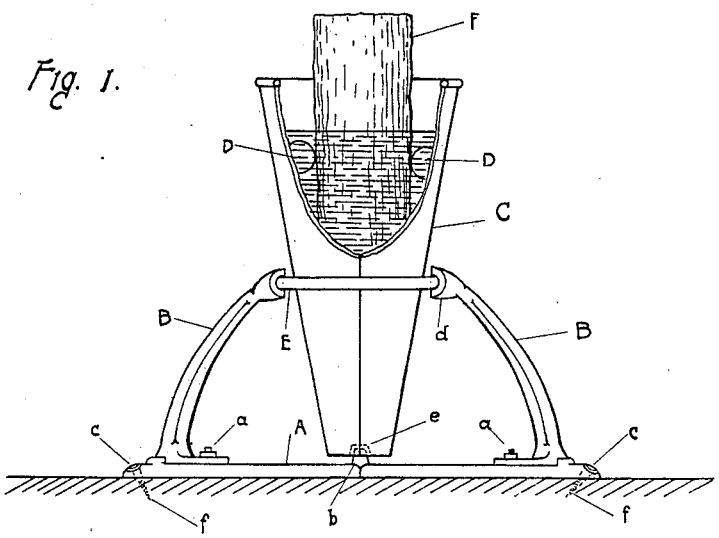
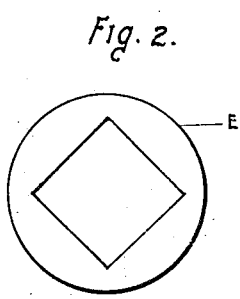
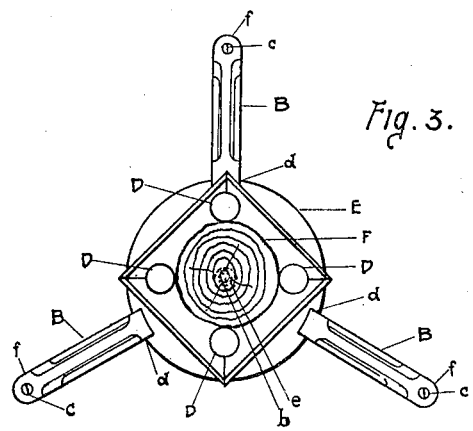
Witnesses
L. A. Whittaker
J. W. Bourscheidt
Inventor
Charles Dreibuss
Per Martin Scherer,
Attorney.

UNITED STATES PATENT OFFICE.

CHARLES DREIBUSS, OF ST. LOUIS, MISSOURI.

TREE OR STAFF HOLDER.

No. 913,474.      Specification of Letters Patent.      Patented Feb. 23, 1909.

Application filed March 17, 1908. Serial No. 421,688.

*To all whom it may concern:*

Be it known that I, CHARLES DREIBUSS, a citizen of the United States, residing at St. Louis, State of Missouri, have invented a new and useful Tree or Staff Holder, of which the following is a specification.

My invention relates to improvements in tree or staff holders and the objects of my improvement are first, to afford a rigid holder for the support of a Christmas tree or staff, by means of an inverted hollow frustum of a pyramid can closed at the smaller end, and on which end it may revolve about a dowel point, and in which can is held the tree or staff by means of four marbles, one in each corner of the can; second, to provide the above kind of can into which may be placed water in order to keep the tree green; third, to provide a ring around the above kind of can, which ring fits into the jaws of the legs of a stand, in order that the tree or staff when fastened in the holder may be revolved. I attain these objects by the mechanism illustrated in the accompanying drawing, in which—

Figure 1, is a front view of the stand, can holder and ring, with part of the can holder broken out, showing how the tree or staff is held firmly by means of the marbles. Fig. 2 is a top view of the ring, which fits around the can holder and permits the holder to revolve. Fig. 3 is a top view of the holder showing the can holder, ring and legs of the stand.

Similar letters refer to similar parts through the several views.

Referring to Figs. 1, 2, and 3, letter A represents a three armed base on each of which arms is fastened by the bolts *a*, legs B, each of the arms of the base has a screw hole *c*, countersunk in its end by which the base may be fastened down by screws *f*, letter *b* represents a dowel pin in the center of the base, which fits into the hole *e* in the bottom of the cup or holder C, which is a tapered hollow inverted frustum of a pyramid open at the widest end and into which is placed the Christmas tree or staff F, and into which water may be placed to keep the tree green. Letter D, represents the four marbles, one of which is placed in each of the four corners of the holder and which hold the tree or staff F. firmly. Letter B, represents curved legs, each of which is fastened to an arm of the base A. by means of the bolts *a*, and which legs have on their upper end a small jaw *d*, into which fits loosely a ring E., the inside of which is square in order to receive the cup or holder C. and which ring may be revolved or moved through the jaw *d*.

In fastening the tree or staff, it is placed in the holder C. and fastened by placing the four marbles D. in its corners, the tree or staff and holder are then placed through the ring E. and onto the pin *b*. Water may then be placed in the holder in the case of a tree in order to keep it green and keep the needles of the tree from falling.

Having described my invention what I claim is,

In a tree or staff holder, the combination of a three legged base having three upright curved arms, each arm having a recessed top end; and the base having a dowel pin at its center; a ring fitting and rotating in the top recessed ends of the upright arms of the base, having a square opening in its center; a square tapered can fitting into the ring and having a hollow bottom, which bottom fits and rotates about the dowel pin at the center of the base, and the can capable of holding a liquid; and four marbles, one of the marbles in each of the four edges of the can, all substantially as set forth and described.

In testimony whereof, I hereunto affix my signature in the presence of two witnesses.

CHARLES DREIBUSS.

Witnesses:
M. BARADA,
M. E. HAENEL.